United States Patent [19]
Koch

[11] Patent Number: 6,016,778
[45] Date of Patent: Jan. 25, 2000

[54] MAGNET VALVE, IN PARTICULAR FOR INLET AND OUTLET VALVES OF INTERNAL COMBUSTION ENGINES

[75] Inventor: Achim Koch, Tegernheim, Germany

[73] Assignee: Siemens Aktiengesellschaft, Munich, Germany

[21] Appl. No.: 09/133,890

[22] Filed: Aug. 14, 1998

[30] Foreign Application Priority Data

Aug. 14, 1997 [DE] Germany ............................ 197 35 375

[51] Int. Cl.⁷ .................................................. F01L 9/04
[52] U.S. Cl. ................................. 123/90.11; 251/129.01; 251/129.1
[58] Field of Search .................... 123/90.11; 251/129.01, 251/129.02, 129.05, 129.09, 129.1

[56] References Cited

U.S. PATENT DOCUMENTS

| | | | |
|---|---|---|---|
| 5,216,987 | 6/1993 | Clarke ................................... | 123/90.11 |
| 5,636,601 | 6/1997 | Moriya et al. ........................ | 123/90.11 |
| 5,711,259 | 1/1998 | Pischinger et al. .................. | 123/90.11 |
| 5,769,043 | 6/1998 | Nitkiewicz ............................ | 123/90.11 |

FOREIGN PATENT DOCUMENTS

| | | |
|---|---|---|
| 0400389A2 | 12/1990 | European Pat. Off. . |
| 0493634B1 | 11/1995 | European Pat. Off. . |
| 2302762A | 1/1997 | United Kingdom . |

*Primary Examiner*—Weilun Lo
*Attorney, Agent, or Firm*—Herbert L. Lerner; Laurence A. Greenberg

[57] ABSTRACT

The invention pertains to a magnet valve. The magnet valve has a ferromagnetic coil body with a winding and defines first and second terminal positions. An armature for driving a valve is displaceably disposed in the ferromagnetic coil body between the first terminal position and the second terminal position. The magnet valve also has a housing with a support and a spring is braced between the armature and the support. The magnet valve further has a piezoelectric measuring instrument disposed between the spring and the support for detecting a position of the armature. The measuring instrument provides an output signal which is dependent on a spring force of the spring. In turn, the spring force is associated with a position of the armature. The actual speed of the armature is determined from the position of the armature and the actual speed of the armature is used to regulate a future speed of the armature.

7 Claims, 1 Drawing Sheet

MAGNET VALVE, IN PARTICULAR FOR INLET AND OUTLET VALVES OF INTERNAL COMBUSTION ENGINES

BACKGROUND OF THE INVENTION

Field of the Invention

The invention relates to a magnet valve, in particular for inlet and outlet valves of an internal combustion engine. A magnet valve generally has a ferromagnetic coil body with a winding, an armature which is displaceable in the coil body between two terminal positions to drive a valve, a spring braced between the armature and a housing, and a measuring instrument for detecting the position of the armature.

Electromagnetic drive mechanisms for inlet and outlet valves of internal combustion engines are known. In contrast to camshaft-actuated valves, magnet valves are triggered to open and close by an engine control unit as a function of the rotary position of the crank shaft. The magnet drive mechanism must be capable of exerting strong forces, especially upon the opening of an outlet valve. At all times, it must be assured that the intended terminal position of the valve is reached upon opening and closing.

In magnet valves, it is known to vary the current to the magnet winding as a function of the valve stroke as described in European Patent Application No. 0 400 389 A2. Thus during a first phase the magnet winding receives a maximum current value, which is varied at a certain frequency between an upper and a lower amplitude value. As soon as the armature is displaced and thus the air gap between the armature and the ferromagnetic winding body is reduced in size, the inductance of the winding rises. The inductance is measured and used as a measure of the course of the stroke. In a second phase the frequency of the exciter current for the winding is reduced until the termination position of the valve is reached, whereupon the coil current is switched over to a lower holding current. In other words, the known triggering of the magnet valve involves an interception current circuit, which as a function of the valve stroke triggers the winding in such a way that the valve will reliably reach the terminal position without recoil and will be held in that position. From the same European Patent Application it is also known to reduce the current to a medium value before the terminal position is reached.

The armature position of the valve can also be detected by other methods. For instance it is known to use an optical position transducer in order to detect the position of an armature that actuates a gas exchange valve, the armature being in the form of an armature disk, or to detect it with a plurality of optical position transducers as described in European Patent No. 0 493 634 B1. Using optical stroke sensors is problematic because of the risk of soiling, and magnetic stroke sensors, such as Hall sensors, furnish imprecise measurement signals, since major electromagnetic interference occurs in the vicinity of the magnet drive mechanism.

SUMMARY OF THE INVENTION

It is accordingly an object of the invention to provide a magnet valve which overcomes the above-mentioned disadvantages of the prior art devices of this general type, in which the position of the armature of the magnet valve is detected reliably and largely without interference by using simple devices.

With the foregoing and other objects in view there is provided, in accordance with the invention, a magnet valve, including: a ferromagnetic coil body having a winding and defining a first terminal position and a second terminal position; an armature for driving a valve is displaceably disposed in the ferromagnetic coil body between the first terminal position and the second terminal position; a housing with a support; a spring braced between the armature and the support; a piezoelectric measuring instrument disposed between the spring and the support for detecting a position of the armature, the measuring instrument provides an output signal which is dependent on a spring force of the spring, the spring force is associated with a position of the armature, and an actual speed of the armature is determined from the position of the armature and the actual speed of the armature is used to regulate the speed of the armature.

According to the invention, the spring force is measured with a piezoelectric element. With the measured value the speed of the armature can be ascertained and regulated, via the current supplied to the winding, in such a way that the desired ratio and position of the valve is obtained. If the spring has a linear characteristic curve, then the spring force varies in linear proportion to the position of the armature. But even with a progressive spring force course, it is possible to base the regulation on the signal output by the piezoelectric element.

It is expedient to measure the output signal furnished by the piezoelectric element in both terminal positions of the stroke of the valve and to determine the position of the armature from the two measured values. This is possible because of the linear dependency of the piezoelectric signal and thus the position of the armature between the two terminal values. It is also possible to determine the armature position by measuring the output signal of the piezoelectric element at time intervals and determining the armature speed from this. With this signal, the circuit for triggering the magnet drive mechanism can be regulated to achieve a minimal impact speed of the armature at the respective terminal position.

Moreover, with a piezoelectric element the valve play can be determined by evaluating the abrupt change in force of the spring when the valve play is overcome. This requires two piezoelectric elements whose signals are compared with one another.

In accordance with an added feature of the invention, the position of the armature is measured at predetermined time intervals and the actual speed of the armature is calculated therefrom.

In accordance with an additional feature of the invention, an abrupt change in force of the spring occurs after valve play is overcome, the abrupt change in the force is measured for determining the valve play.

In accordance with another feature of the invention, there is a further spring, and wherein the winding of the coil body is a first winding spaced apart from a second winding, the armature has an armature disk disposed between the first winding and the second winding, the armature disk is urged into the first terminal position by the spring disposed between the armature and the housing and into the second terminal position oriented toward the valve by the further spring, the armature disk is held by the spring and the further spring in a middle position if the first winding and the second winding are without current, excitation of the first winding closes the valve, and excitation of the second winding opens the valve.

In accordance with yet another added feature of the invention, there is a valve guide for supporting the valve and a second piezoelectric element, the second piezoelectric element is disposed between the further spring toward the valve and the valve guide toward the housing for detecting the valve play.

In accordance with a concomitant feature of the invention, the magnet valve is either an intake valve or an outlet valve of an internal combustion engine.

Other features which are considered as characteristic for the invention are set forth in the appended claims.

Although the invention is illustrated and described herein as embodied in a magnet valve, in particular for inlet and outlet valves of internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
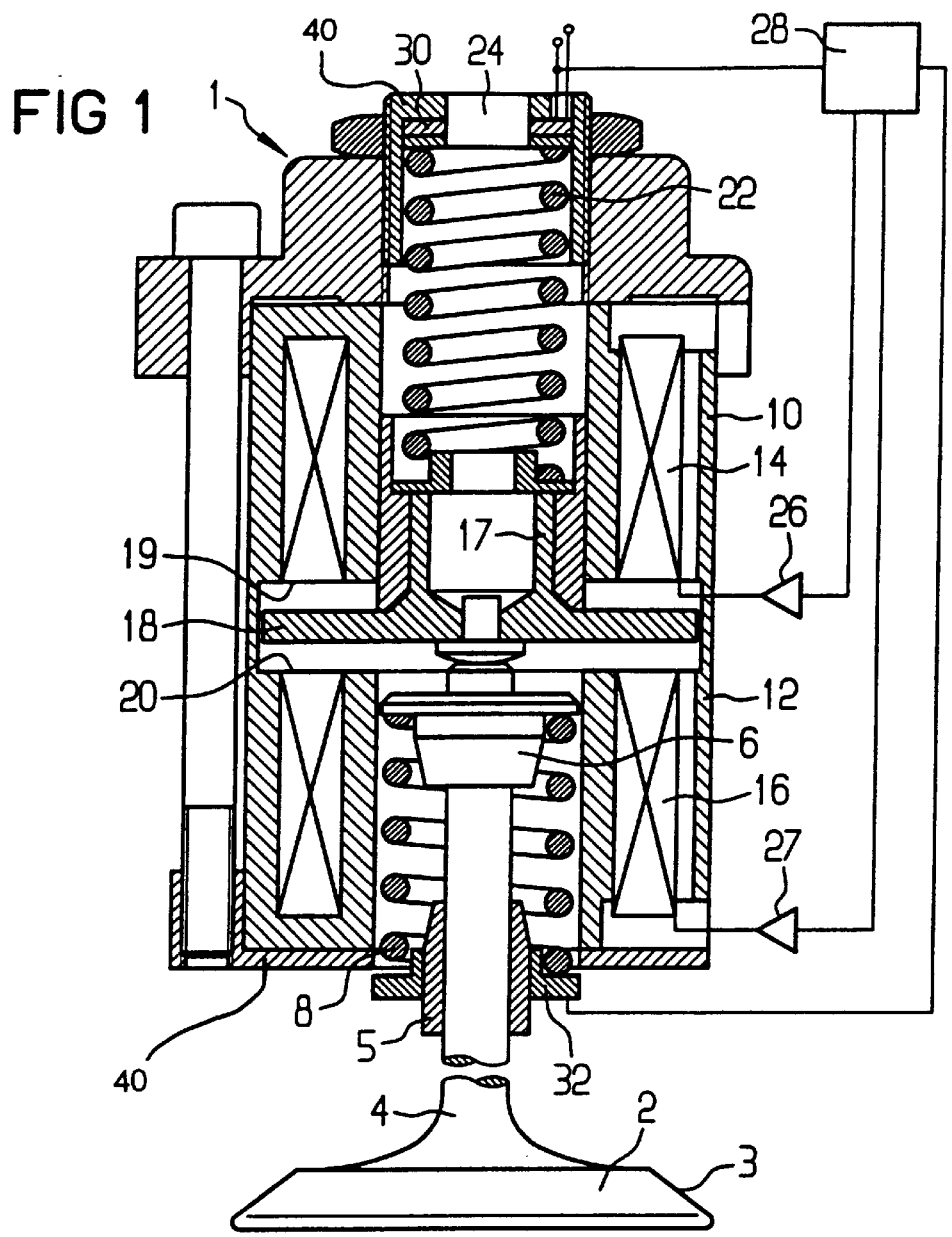
FIG. 1 is a sectional view through a magnet valve with built-in piezoelectric elements.

Referring now to the figures of the drawing in detail and first, particularly, to FIG. 1 thereof, there is shown an electromagnetic drive mechanism 1 for a valve. The valve includes a valve plate 2 with a valve seat 3 and a valve shaft 4. The valve plate 2 is supported in a valve guide 5 disposed in a housing 40. The valve plate 2 has on its upper end a conical piece (a valve cone) 6. The valve plate 2 can be moved between two terminal positions. The first position is an upper terminal position, where the valve is closed. The second position is a lower terminal position where the valve is open. A spring 8 is disposed between the valve guide 5 and the valve cone 6 to urge the valve plate 2 into the closed position.

The magnet drive mechanism 1 includes an upper ferromagnetic coil body 10 and a lower ferromagnetic coil body 12. Each of the coil bodies 10, 12 carries a respective winding 14 and 16. An armature shaft 17 is supported displaceably inside the upper coil body 10 and has an armature disk 18, which is disposed between the two windings 14 and 16. The face ends 19 and 20 of the two coil bodies 10 and 12 oriented toward the armature disk 18 form stops for the armature disk 18 and thus define the upper and lower terminal positions of the valve, in which it is closed and opened, respectively.

A further spring 22 is disposed between the armature 17 and a stop 24. The spring 22 urges the armature 17 in the direction of the open position of the valve plate 2. The armature disk 18 rests on the valve shaft 4. As long as the windings 14 and 16 are currentless, the armature disk 18 is held by the two springs 8 and 22 in the middle position between the two stops 19 and 20, as shown in the drawing.

The two windings 14 and 16 are each supplied with current by a respective driver circuit 26, 27, and these circuits are triggered by a closed-loop control circuit 28.

Inserted between the stop 24 toward the housing 40 and the spring 22 is a first piezoelectric element 30. The piezoelectric element 30 measures the force of the spring 22 when the lower winding 16 is supplied with current in order to open the valve, or when the upper winding 14 is supplied with current in order to close the valve. The output signal of the piezoelectric element 30 is delivered to the closed-loop control circuit 28. The output signal serves to regulate the impact speed of the armature disk 18 upon the coil bodies 10 and 12 at the respective stops 19 and 20 to pull the valve quickly and reliably, without recoiling, into the respective terminal position and to hold it at the respective terminal position. With the piezoelectric element 30, the respective position of the armature 17 and thus of the valve and hence the stroke course and thus the speed of the armature 17 can all be determined.

A second piezoelectric element 32 is inserted between the spring 8 toward the valve and the valve guide 5 toward the housing 40 for measuring the force of the spring 8 toward the valve. If the valve is to be switched to the open position, the valve play has to be overcome. Once the valve play is overcome, a sudden change in force occurs at the spring 8 toward the valve and the spring 8 is compressed on moving out of the valve seat 3. The sudden change in force also occurs upon closure, when the valve plate drops 2 into the valve seat 3 and the force exerted by the spring 8 then falls away. The sudden change in force is detected by the piezoelectric element 32, and its output signal is compared with the signal of the piezoelectric element 30 toward the drive mechanism, if the element indicates that the armature disk 18 is in one of the two terminal positions. The valve play can thus be determined from a comparison of the two signals. This is advantageous if adjustment work becomes necessary.

Conversely, if a hydraulic valve play compensation is available, then it is possible to dispense with determining the valve play and hence to dispense with the piezoelectric element 32 toward the valve.

Figure 2:
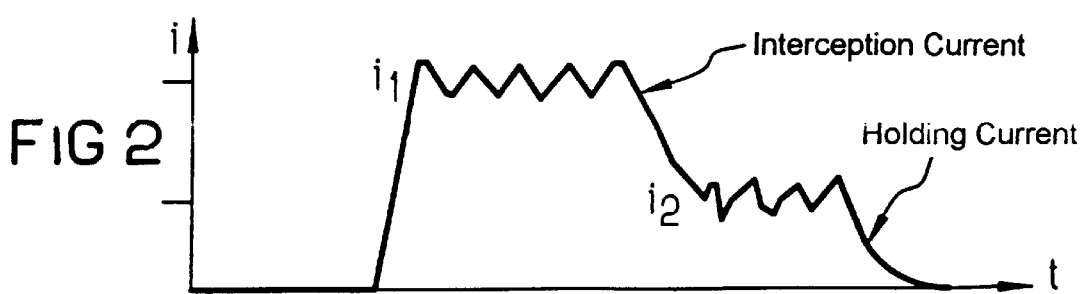
FIG. 2 is a graph of a current course of an interception current circuit for the magnet valve.

In FIG. 2, a current course in the winding 14 or 16 is established by the control circuit 28 in order for, with the aid of an interception current circuit, the valve moves reliably over to the other respective terminal position without recoiling, is shown. To that end, the holding current that holds the armature 17 in its respective terminal position is switched off, so that the armature 17 is urged into motion toward the other terminal position by the applicable, relaxed spring. Once the armature 17 reaches the vicinity of the other stop 19 or 20, which can be measured via the change in force of the spring 22 by the piezoelectric element 30, then the associated winding 14 or 16 is supplied with an interception current i1. The current i1 is held at the interception current level by clocking, as can be seen from FIG. 2. Once the armature disk 18 is seated on the respective stop 19 or 20, the associated winding can be switched over to the lower holding current i2, which suffices to keep the armature disk 18 and thus the valve durably in the respective terminal position. When the holding current i2 is turned off, the armature disk 18 and the valve then return to the middle position.

I claim:

1. A magnet valve, comprising:
   a ferromagnetic coil body having a winding and defining a first terminal position and a second terminal position;
   an armature for driving a valve, said armature being displaceably disposed in said ferromagnetic coil body between said first terminal position and said second terminal position;
   a housing with a support;
   a spring braced between said armature and said support;

a piezoelectric measuring instrument disposed between said spring and said support for detecting a position of said armature, said measuring instrument providing an output signal dependent on a spring force of said spring, the spring force being associated with a position of said armature, and wherein an actual speed of said armature is determined from the position of said armature and the actual speed of said armature is used to regulate the speed of said armature.

2. The magnet valve according to claim 1, wherein the position of said armature is measured at predetermined time intervals and the actual speed of the armature is calculated therefrom.

3. The magnet valve according to claim 1, wherein an abrupt change in force of said spring occurs after valve play is overcome, the abrupt change in the force is measured for determining the valve play.

4. The magnet valve according to claim 1, including a further spring, and wherein said winding of said coil body is a first winding spaced apart from a second winding, said first winding is disposed toward said armature and said second winding is disposed toward the valve, said armature having an armature disk disposed between said first winding and said second winding, said armature disk is urged to said first terminal position by said spring disposed between said armature and said housing and to said second terminal position by said further spring, said armature disk is held by said spring and said further spring in a middle position if said first winding and said second winding are without current, excitation of said first winding closes the valve, and excitation of said second winding opens the valve.

5. The magnet valve according to claim 4, including a valve guide for supporting the valve and including a second piezoelectric element, said second piezoelectric element disposed between said further spring toward the valve and said valve guide toward said housing for detecting the valve play.

6. The magnet valve according to claim 1, wherein the magnet valve is an intake valve of an internal combustion engine.

7. The magnet valve according to claim 1, wherein the magnet valve is an outlet valve of an internal combustion engine.

* * * * *